United States Patent [19]

Onder

[11] 4,021,412

[45] May 3, 1977

[54] ALKALI METAL LACTAMATE CATALYST FOR THE POLYMERIZATION OF DIISOCYANATE WITH TETRACARBOXYLIC ACID/DIANHYDRIDE

[75] Inventor: Besir K. Onder, North Haven, Conn.

[73] Assignee: The Upjohn Company, Kalamazoo, Mich.

[22] Filed: Nov. 7, 1974

[21] Appl. No.: 521,745

[52] U.S. Cl. .............................. 260/63 N; 260/30.2; 260/32.6 NA; 260/47 CP; 260/78 R; 260/78 TF

[51] Int. Cl.$^2$ .................. C08G 18/08; C08G 73/00

[58] Field of Search ............ 260/78 TF, 65, 47 CP, 260/47 CB, 63 N

[56] References Cited

UNITED STATES PATENTS

| | | |
|---|---|---|
| 3,562,217 | 2/1971 | Zalewski et al. ................ 260/78 TF |
| 3,620,987 | 11/1971 | McLaughlin .................... 260/78 TF |
| 3,658,773 | 4/1972 | Zecher et al. ................... 260/78 TF |
| 3,682,860 | 8/1972 | Yoda et al. ...................... 260/78 TF |
| 3,701,756 | 10/1972 | Carleton et al. ................. 260/78 TF |
| 3,803,100 | 4/1974 | Izumi et al. ..................... 260/78 TF |
| 3,853,813 | 12/1974 | Edelman et al. ................ 260/78 TF |
| 3,873,503 | 3/1975 | Hoheisel et al. ................ 260/78 TF |

Primary Examiner—Harold D. Anderson

Attorney, Agent, or Firm—James S. Rose; Denis A. Firth

[57] ABSTRACT

The use of certain catalysts provide for an improved process for the preparation of soluble polyimides, polyamides, and polyamideimides. The catalysts are compounds of formula

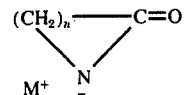

wherein M represents an alkali metal, and $n$ is an integer from 2 to 5 inclusive. The improved process comprises reacting organic diisocyanates with polycarboxylic compounds consisting of tetracarboxylic acids or the intramolecular dianhydrides thereof, tricarboxylic acids or the monoanhydrides thereof, dicarboxylic acids, and mixtures thereof, in the presence of said catalysts. The polymers are obtained in solution at low reaction temperatures and short reaction times thereby avoiding side-reactions which otherwise would be detrimental to polymer molecular weight and ultimate polymer properties.

11 Claims, No Drawings

ALKALI METAL LACTAMATE CATALYST FOR THE POLYMERIZATION OF DIISOCYANATE WITH TETRACARBOXYLIC ACID/DIANHYDRIDE

BACKGROUND OF THE INVENTION

1. Field of the Invention

This invention relates to a novel process and is more particularly concerned with improved processes for the preparation of polyimides, polyamides, and copolymeric mixtures thereof.

2. Description of the Prior Art

The reaction of diisocyanates with dicarboxylic acids and dianhydrides in solution to form polyamides and polyimides is well known in the polymer art; see for example U.S. Pat. No. 3,592,789 wherein there is disclosed the formation of coating solutions by reacting a diisocyanate, such as 4,4′-methylenebis(phenylisocyanate) with trimellitic anhydride in dimethylformamide at about 150° to 300° F, and conversion to the cured polymer at 200° to 420° C; U.S. Pat. No. 3,541,038 discloses the polymerization of trimellitic anhydride with diisocyanates at elevated temperatures; and U.S. Pat. No. 3,708,458 discloses the formation of polyimides requiring long reaction times. U.S. Pat. No. 3,701,756 teaches the use of certain hydroxides and ureas as catalysts for the reaction of isocyanates with anhydrides. However, such catalysts are extremely difficult to remove from the products so obtained. It is known to those skilled in the polymer art that the reaction of diisocyanates with dicarboxylic acids in solution to form polyamides requires even higher temperatures than those called for in the prior art hereinbefore cited; see for example U.S. Pat. No. 3,642,715.

It has been well established that isocyanates react with some dipolar aprotic solvents such as dimethylformamide, dimethylacetamide, N-methylpyrrolidone, and the like, at elevated temperatures. See M. R. Weiner, J. Org. Chem. 25, 2245 (1960) and S. Terney et al., J. Polym. Sci., Part A-1, 8, 683 (1970). For example, heating of phenylisocyanate in dimethylformamide at only 150° C for 150 minutes gives a 35% yield of N-phenyl-N′,N′-dimethylformamidine and 30% of a cycloaddition adduct derived from a further reaction of the formamidine with four moles of phenylisocyanate. The side reactions arising during polyermizations involving the use of isocyanates in such solvents, have already been considered; see, The Reaction of Isocyanates with Polar Solvents, by H. Ulrich, paper presented at the University of Detriot, 1974 Polymer Conference Series. The side reactions easily lead to chain termination (i.e., lowering of polymer molecular weight), or crosslinking and incorporation of units other than amide or imide into the polymer chain, all of which are highly undesirable when high molecular weight, linear polymers are desired.

I have now found a process for carrying out the polymerization reactions hereinbefore described and known from the prior art, said process being free of the difficulties described hereinabove. The novel process of the present invention provides for lower polymerization temperatures, and shorter polymerization times, when compared to the prior art. As an added advantage to flow from the use of lower reaction temperatures, problems arising from possible solvent — isocyanate interaction have been eliminated. Therefore the soluble polymers obtained by the process of the present invention are characterized by having excellent molecular weight.

SUMMARY OF THE INVENTION

This invention comprises a process for preparing an essentially linear, solvent soluble polyimide, polyamide, or polyamideimide by the condensation of an organic diisocyanate with the appropriate polycarboxylic acid derivative in said solvent, the improvement which comprises carrying out said process in the presence of a catalytic amount of a compound

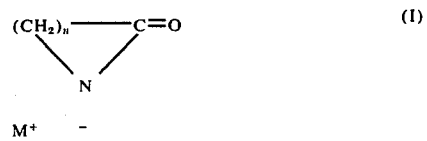

wherein $n$ is an integer from 2 to 5 inclusive and M is n alkali metal.

The term "alkali metal" means sodium, potassium, and lithium.

The term "solvent" means a dipolar aprotic solvent.

The term "appropriate polycarboxylic acid derivative" means a difunctional polycarboxylic compound containing two groups available to react with the diisocyanate regardless of whether they be two carboxylic acid groups, two intramolecular carboxylic anhydride groups (or the free carboxylic acids thereof), or one free carboxylic acid group with one intramolecular anhydride group (or the free carboxylic acids thereof).

DETAILED DESCRIPTION OF THE INVENTION

The process of the invention is applicable to the preparation of any polyimide, polyamide, or polyamideimide which is soluble, at least to the extent of about 5 percent by weight, in the reaction solvent used in its preparation. Such polyimides, polyamides, and polyamideimides are a well known class in the art, see for example: U.S. Pat. Nos. 3,063,966, 3,541,038, 3,592,789, 3,642,715, 3,692,740, 3,696,077, 3,708,458, 3,787,367.

The novel feature of the process of the invention lies in the use of the particular catalyst set forth above. The procedure employed in carrying out the process of the invention is essentially that employed hitherto in the particular condensation with the notable exception that the aforesaid catalyst is always present in the reaction mixture.

The process of the invention is accomplished in the presence of a catalytic amount of at least one compound of formula (I). By catalytic amount is meant an amount less than 1 mole per mole of isocyanate employed. The amount of compound (I) employed is advantageously from about 0.001 mole to about 0.2 mole per mole of isocyanate, and preferably is from about 0.002 mole to about 0.02 mole per mole of isocyanate. Compound (I) in excess of the proportions set forth can be employed, if desired, but will afford no additional advantage.

The catalysts of formula (I) defined hereinbefore are N-alkali metal lactamates and are well known to those skilled in the preparation of polyamides from lactams (see U.S. Pat. No. 3,549,580). The alkali metal lactamates are commercially available (Foote Mineral Co., Exton, PA) or they can be easily prepared from the desired lactam and an alkali metal hydride in an inert solvent and the resulting salt obtained by removal of said solvent. Typical examples of the catalysts of formula (I) used in the process of the present invention include: sodium propiolactamate, potassium propiolactamate, lithium propiolactamate, sodium pyrrolidone (sodium butyrolactamate), potassium pyrrolidone (potassium butyrolactamate), lithium pyrrolidone (lithium butyrolactamate), sodium valerolactamate, potassium valerolactamate, lithium valerolactamate, sodium caprolactamate, potassium caprolactamate, lithium caprolactamate. A preferred group of catalysts of formulae (I) consist of the alkali metal salts of pyrrolidone. A particularly preferred catalyst of formula (I) is lithium pyrrolidone.

The process of the present invention is accomplished by bringing together in solution under anhydrous conditions, a difunctional polycarboxylic compound, an organic diisocyanate and a catalytic amount of a compound of formula (I). It will be recognized by those skilled in the art that reasonable precautions to exclude moisture should be exercised because of the tendency for isocyanates to react with water. Such precautions include the use of dry solvents, dry apparatus, and carrying out the reaction under an inert atmosphere, i.e., nitrogen. The reactants and conditions will be defined in detail hereinafter. In a preferred embodiment of the present invention the difunctional polycarboxylic compound and catalyst are dissolved in a dipolar aprotic solvent and the diisocyanate added thereto while the solution is being heated and stirred. The stirring assists in achieving homogeneity and advantageously aids in the removal of the carbon dioxide formed during the polymerization reaction. While the procedure as set forth above is a preferred embodiment, it is to be understood that the process of the present invention can also be readily accomplished by the initial admixture in solvent of all the ingredients which, upon heating, form the corresponding polymers in solution. In a most preferred embodiment, the diisocyanate is added, as a solution dissolved in a dipolar aprotic solvent, to the heated solution comprising the polycarboxylic compound and the catalyst of formula (I).

The process of the present invention is advantageously conducted at elevated temperatures from about 40° C to about 140° C and preferably from about 60° C to about 130° C. Higher reaction temperatures can be employed, however, such higher temperatures offer no advantage and insofar as solvent — isocyanate side reaction can occur thereat, their use is not particularly recommended.

The progress of the polymerization reaction is easily monitored by any suitable analytical method known to one skilled in the polymer art. A particularly suitable method is infrared analysis. The characteristic absorptions arising from the isocyanate groups of the organic diisocyanate (4.4μ), and the functional groups of the polycarboxylic compounds such as the anhydride group (5.4μ), the carboxylic acid group (5.85μ), along with the characteristic absorptions of the polymers obtained therefrom such as the imide group (5.60, 5.80 and 7.25μ), and amide group (6.00μ), allow for the facile determination of the progress and completion of the polymerization. The reaction is continued until the diisocyanate and difunctional polycarboxylic compound are no longer detectable by infrared absorption analysis. The process of the present invention is advantageously accomplished in a period from about 2 hours to about 15 hours and preferably from about 4 hours to about 10 hours. Illustrative of the solvents used in the present invention are dimethylsulfoxide, diethylsulfoxide, dimethylformamide, diethylformamide, dimethylacetamide, diethylacetamide, tetramethylurea, hexamethylphosphoramide, N-methylpyrrolidone, tetramethylenesulfone, and mixtures thereof. A particularly preferred group of solvents consists of dimethylformamide and N-methylpyrrolidone.

It will be appreciated by one skilled in the art that when mixtures of difunctional polycarboxylic compounds hereinafter described, are reacted with a diisocyanate, the product is a random, or block copolymer, depending on the sequence of polycarboxylic compound addition.

The difunctional polycarboxylic compound employed in the process of the invention contains at least two carboxylic moieties selected from the class consisting of free carboxy groups, anhydride groups, and mixtures thereof. Said polycarboxylic compounds are inclusive of aromatic, aliphatic, cycloaliphatic or heterocyclic polycarboxylic acids as well as the intramolecular anhydrides thereof, provided that, in the case of those anhydrides which contain a single anhydride group there is also present in the molecule a free carboxy group.

As will be appreciated by one skilled in the art only those polycarboxylic acids which contain carboxy groups attached either to two adjacent carbon atoms or to two carbon atoms which are separated from each other by a single carbon or hetero-atom are capable of forming intramolecular acid anhydrides.

Any of the aforesaid polycarboxylic acids or anhydrides can be employed as the difunctional polycarboxylic compounds in the process of the invention. As will be apparent to the skilled chemist the nature of the recurring units in the resulting polymers will vary according to the structure of the starting difunctional polycarboxylic compound.

When the polycarboxylic compound is a dicarboxylic acid which is incapable of forming an intramolecular anhydride, the product formed in accordance with the process of the invention is a polyamide e.g. the product from said dicarboxylic acid and a diisocyanate would contain the recurring unit

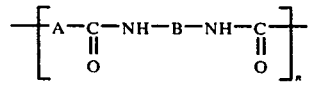

wherein A is the hydrocarbon residue of the dicarboxylic acid starting material and B is the hydrocarbon residue of the diisocyanate. On the other hand, when the polycarboxylic compound is an intramolecular anhydride which contains two anhydride moieties or contains one anhydride moiety and free carboxylic acid groups capable of intramolecular anhydride formation, the product of reaction in accordance with the process of the invention is a polyimide e.g. the product of reaction of a diisocyanate and a polycarboxylic compound containing two intramolecular anhydride groups would contain the recurring unit

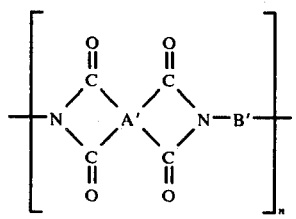

wherein A' is the hydrocarbon residue of the dianhydride and B' is the hydrocarbon residue of the diisocyanate.

Similarly where the polycarboxylic compound contains one anhydride group in addition to a free carboxylic acid group, the polymer resulting from the process of the invention will be a hybrid containing both amide and imide linkages.

All of the above types of polymers can be prepared in accordance with the novel process hereinabove described and all fall within the scope of this invention. Thus, by appropriate choice of the polycarboxylic compound it is possible to prepare any of a wide variety of polymers using the single step process of the invention.

Illustrative examples of aromatic dicarboxylic acids employed in the process of the present invention include, isophthalic acid and terephthalic acid. Illustrative examples of aliphatic dicarboxylic acids employed in the present invention are malonic acid, succinic acid, glutaric acid, adipic acid, pimelic acid, suberic acid, azelaic acid, sebacic acid, 1–11-undecanedioic acid, 1–12-dodecanedioic acid and brassylic acid. Illustrative examples of cycloaliphatic dicarboxylic acids include, 1,3-cyclopentanedicarboxylic acid, and 1,4-cyclohexanedicarboxylic acid. A particularly preferred aromatic diacid is isophthalic acid and, a particularly preferred aliphatic diacid is brassylic acid.

Examples of polycarboxylic compounds which can be employed as the free carboxylic acids or intramolecular anhydrides thereof, are:

trimellitic acid and the anhydride thereof,
pyromellitic acid and the dianhydride thereof,
mellophanic acid and the anhydride thereof,
benzene-1,2,3,4-tetracarboxylic acid and the dianhydride thereof,
benzene-1,2,3-tricarboxylic acid and the anhydride thereof,
diphenyl-3,3',4,4'-tetracarboxylic acid and the dianhydride thereof,
diphenyl-2,2',3,3'-tetracarboxylic acid and the dianhydride thereof,
naphthalene-2,3,6,7-tetracarboxylic acid and the dianhydride thereof,
naphthalene-1,2,4,5-tetracarboxylic acid and the dianhydride thereof,
naphthalene-1,4,5,8-tetracarboxylic acid and the dianhydride thereof,
decahydronaphthalene-1,4,5,8-tetracarboxylic acid and the dianhydride thereof,
4,8-dimethyl-1,2,3,5,6,7-hexahydronaphthalene-1,2,5,6-tetracarboxylic acid and the dianhydride thereof,
2,6-dichloronaphthalene-1,4,5,8-tetracarboxylic acid and the dianhydride thereof,
2,7-dichloronaphthalene-1,4,5,8-tetracarboxylic acid and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianhydride thereof,
bis(2,3-dicarboxyphenyl)methane and the dianhydride thereof,
bis(3,4-dicarboxyphenyl)methane and the dianhydride thereof,
1,1-bis(2,3-dicarboxyphenyl)ethane and the dianhydride thereof,
1,1-bis(3,4-dicarboxyphenyl)ethane and the dianhydride thereof,
2,2-bis(2,3-dicarboxyphenyl)propane and the dianhydride thereof,
2,3-bis(3,4-dicarboxyphenyl)propane and the dianhydride thereof,
bis(3,4-dicarboxyphenyl)sulfone and the dianhydride thereof,
bis(3,4-dicarboxyphenyl)ether and the dianhydride thereof,
ethylene tetracarboxylic acid and the dianhydride thereof,
butane-1,2,3,4-tetracarboxylic acid and the dianhydride thereof,
cyclopentane-1,2,3,4-tetracarboxylic acid and the dianhydride thereof,
pyrrolidine-2,3,4,5-tetracarboxylic acid and the dianhydride thereof,
pyrazine-2,3,5,6-tetracarboxylic acid and the dianhydride thereof,
thiophen-2,3,4,5-tetracarboxylic acid and the dianhydride thereof,
and benzophenone-3,3',4,4'-tetracarboxylic acid and the dianhydride thereof.

Other anhydrides which may be employed in the practice of the invention are; the intermolecular anhydride of trimellitic acid 1,2-anhydride (see, for example U.S. Pat. No. 3,155,687), the bis-anhydrides disclosed in U.S. Pat. No. 3,277,117 [e.g. 4,4'-ethylene glycol bis-anhydro trimellitate and 4,4'-(2-acetyl-1,3-glycerol) bis-anhydro trimellitate] and the di-adducts of maleic acid or anhydride with styrene.

While any of the polycarboxylic acids and intramolecular anhydrides thereof defined and exemplified above can be employed in the preparation of the polymers of the invention, a preferred group of compounds for this purpose are intramolecular anhydrides which are derived from polycarboxylic acids having at least 3 carboxyl groups of which at least two carboxyl groups are attached directly to an aromatic nucleus in ortho-position with respect to each other. A preferred group of polycarboxylic acid intramolecular anhydrides are those selected from the class consisting of anhydrides having the following formulae

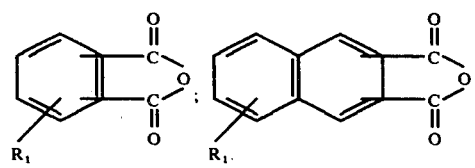

-continued

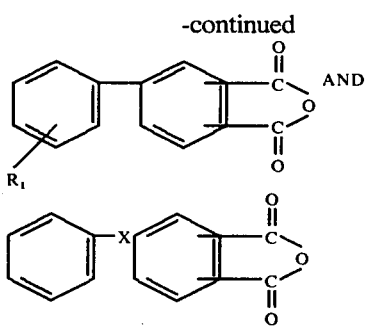

wherein $R_1$ represents a group selected from the class consisting of carboxyl and the group

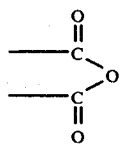

wherein the carbon atoms of the latter are each attached to adjacent atoms in an aromatic ring, and wherein X is a bridging group selected from the class consisting of loweralkylene, carbonyl, sulfonyl and oxygen. The term "loweralkylene" means alkylene containing from 1 to 6 carbon atoms, inclusive, such as methylene, ethylene, 1,3-propylene, 1,4-butylene, 2,3-butylene, 1,6-hexylene and the like. A particularly preferred group consists of, benzophenone-3,3', 4,4'-tetracarboxylic acid dianhydride, trimellitic anhydride, and mixtures thereof containing from about 10 to about 90 mole percent of benzophenone-3,3',4,4'-tetracarboxylic acid dianhydride and from about 90 to about 10 mole percent of trimellitic anhydride.

It is to be understood that mixtures of the aforesaid intramolecular anhydrides with the dicarboxylic acid compounds hereinbefore set forth are within the scope of the present invention. A particularly preferred mixture consists of about 80 mole percent of trimellitic anhydride and 20 mole percent of isophthalic acid.

The diisocyanates which can be employed in the process of the invention include any of the known diisocyanates. Illustrative of the diisocyanates which are employed in the process of the invention are: 2,4-toluene diisocyanate, 2,6-toluene diisocyanate, 4,4'-methylenebis(phenylisocyanate), dianisidine diisocyanate, tolidine diisocyanate, 4,4'-diphenylether diisocyanate, 4,4'-methylenebis(cyclohexylisocyanate), m-xylene diisocyanate, 1,5-naphthalene diisocyanate, and the like. A preferred group of diisocyanates consists of, 2,4-toluenediisocyanate, 2,6-toluenediisocyanate (and mixtures thereof), 4,4'-methylenebis(phenylisocyanate) (MDI), and various mixtures of MDI with the toluenediisocyanates. A preferred mixture consists of from about 10 to about 35 mole percent of 4,4'-methylenebis(phenlisocyanate) and from about 65 to about 90 mole percent of a member selected from the group consisting of 2,4-toluenediisocyanate, 2,6-toluenediisocyanate, and mixtures thereof. A particularly preferred mixture consists of about 20 mole percent of 4,4'-methylenebis(phenylisocyanate) and about 80 mole percent of a member selected from the group consisting of 2,4-toluenediisocyanate, 2,6-toluenediisocyanate, and mixtures thereof.

The proportions of diisocyanate to difunctional polycarboxylic compound employed in the process of the present invention are from about 1.0 mole to about 1.10 mole per mole of polycarboxylic compound, and preferably from about 1.0 mole to about 1.05 mole.

Upon completion of the polymerization reaction the polymer can be left in solution to be used thereafter. In an alternative embodiment, the polymer is isolated in solid form by standard methods known to those skilled in the polymer art. In particular, it is precipitated by pouring the polymer solution into rapidly stirred water, collection of the powdered polymer, followed by washing with water and/or non-solvents, and finally drying to the finished material. It will be recognized by those skilled in the art that isolation of the polymer by precipitation in water will automatically remove the trace amount of catalyst to be found therein. In an optional, and preferred step, the basic catalyst present in the final solution is neutralized by the addition of a minor amount of an acid, preferably a weak acid such as glacial acetic acid. Such a neutralization step obviates any difficulties that may be encountered when the reaction solution of the polymer is to be used directly, i.e., in the making of films, fibers, or coatings.

The polymers prepared by the process of the invention can be employed in any of the uses of which high temperature resistance polyimides or polyamides are currently put in the art, for example, the polymers of the invention in solid form can be molded in the form of bushings, seal faces, electric insulators, compressor vanes and impellers, pistons and piston rings, gears, thread guides, cams, brake lining, clutch faces, abrasive articles and the like. They can be employed in solution in the preparation of coating compositions and can thereby be employed in wire coating and in the casting or spraying of polymer films on a variety of substrates such as metal, ceramic, fabrics, polymerics and the like.

Indeed, as the polymers prepared by the process of the invention form high molecular weight polymers soluble in organic solvents they represent a particularly useful advance in the art since they provide a means of molding or fabricating high temperature resistance polymers, including fibers, without the need to carry out a final chemical reaction to produce the polymer in situ. The polymers also find particular utility in the manufacture of articles having reinforcing or modifying fillers and the like incorporated therein, including the making of high temperature resistant laminates. Thus, fillers such as fiberglass, carbon fibers, graphite, molybdenum disulfide (to impart lubricity), powdered metals such as aluminum, copper and the like, and abrasive materials (for producing grinding wheels and the like) can be added to solutions of the soluble copolyimides of the invention and intimately mixed therewith prior to removal of solvent followed by heat pressing or like techniques necessary to achieve production of the desired article. Other processing advantages which accrue from the high temperature resistance, solvent solubility and thermoplasticity of these copolyimides of the invention will be apparent to one skilled in the art.

The following examples describe the manner and process of making and using the invention and set forth the best mode contemplated by the inventors of carrying out the invention but are not to be construed as limiting.

EXAMPLE 1

A dry 500 ml. resin flask equipped with a stirrer, condenser, thermometer, nitrogen inlet tube, and addition funnel was charged with 64.4 g. (0.2 mole) of commercial grade (97.44% anhydride) 3,3',4,4'-benzophenonetetracarboxylic acid dianhydride (BTDA) and 0.05 g. (0.0005 mole) of lithium pyrrolidone(N-lithium butyrolactam) catalyst. The flask contents were dissolved in 234 g. of dry dimethylformamide (distilled over calcium hydride). The temperature of the contents was raised to 80° C and, during constant stirring under nitrogen, a solution consisting of 10.0 g. (0.04 mole) of 4,4'-methylenebis(phenylisocyanate) (MDI) and 28.0 g. (0.16 mole) of 2,4-toluenediisocyanate (TDI) dissolved in 30 g. of dry dimethylformamide (DMF) was added dropwise over 6 hours. The reaction was continued for another 2 hours at 80° C. At the end of this time, infrared analysis indicated the reaction was complete.

The DMF solution, having an inherent viscosity, $\eta$inh (0.25% at 29.4° C)=0.54, consisting of approximately 25 percent by weight of copolyimide was characterized by a structure wherein approximately 80 percent of the recurring copolyimide units had the formula

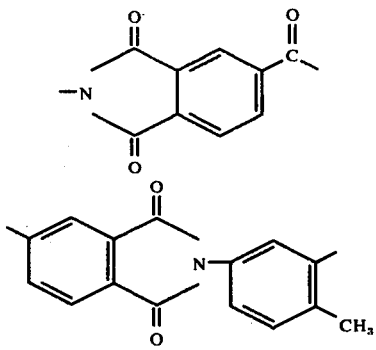

and the remaining 20 percent of the recurring units had the formula

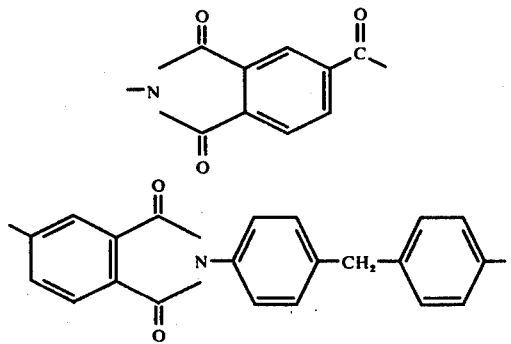

Films were easily cast from this solution and when redissolved in DMF displayed an inherent viscosity of $\eta$inh(0.5% at 28.8° C)=0.59.

EXAMPLE 2

Using the procedure and reactants described in Example 1 except that the DMF was replaced by 175 g. of dry distilled N-methylpyrrolidone (NMP), the quantities of reactants were reduced by one half, and 0.02 g. (0.00025 mole) of lithium pyrrolidone was employed as the catalyst. The isocyanate mixture was dissolved in 20 g. of NMP and the addition time was 4.5 hours at 80° C with an overall reaction period of 6 hours at this temperature. The final copolyimide solution contained about 18 percent by weight of solids and was characterized by an $\eta$inh(0.5% at 29° C)=0.58. Films were easily cast from the NMP solution and when redissolved in NMP the polyimide had an $\eta$inh (0.5% at 29.2° C)=0.65.

EXAMPLE 3

The following example is an uncatalyzed polymerization reaction that was not carried out in accordance with the present invention but is shown for purposes of comparison.

Using the procedure and reactants set forth in Example 1 except for the fact that no catalyst was used, the polymerization described therein was repeated. At the reaction temperature of 80° C after 8.75 hours, (IR analysis showed an appreciable quantity of NCO and anhydride groups remaining. Further, the solution which was 25 percent by weight in solids was quite turbid which was a result of the preferential reaction of the more reactive MDI to form the homo-polyimide which is known to be insoluble, thereby leaving at least a portion the TDI unreacted.

EXAMPLE 4

The following example is a polymerization reaction carried out in the presence of a known catalyst for the reaction of an isocyanate with an anhydride (see J. Drapier, et al., Tetrahedron Letters NO. 6, 419–422, 1973) but not a catalyst according to the present invention.

Using the procedure and reactants set forth in Example 2, the polymerization was carried out in the presence of 0.05 g. (0.00015 mole) of dicobalt octacarbonyl. After a 7 hour reaction period at 80° C, strong bands in the IR absorption spectrum for —NCO and anhydride groups showed the polymerization was proceeding only at a slow rate. As in Example 3, the turbidity of the polymerization solution was an indication of the preferential formation of the insoluble MDI based polyimide. The dicobalt octacarbonyl did not catalyze the copolymerization process.

EXAMPLES 5–6

Using the procedure and reactants of Example 1 and substituting the catalysts set forth in Table I, the copolyimide according to Example 1 was obtained in DMF solution in each of the examples.

TABLE I

| Catalyst (wt. in g.) | Polymer Content (% by wt.) |
|---|---|
| Ex. 5 N-potassium valerolactam (0.12) | 25 |
| Ex. 6 N-potassium caprolactam (0.14) | 25 |

EXAMPLE 7

A dry 500 ml. flask equipped as described in Example 1 was charged with 38.4 g. (0.2 mole) of sublimed TMA (trimellite anhydride) and 0.18 g. (0.0015 mole) of potassium pyrrolidone (potassium butyrolactamate) catalyst along with 244 g. of NMP (dried by distillation from calcium hydride). The temperature of the solution was raised to 115° C while the solution was stirred under nitrogen. The addition funnel was charged with 51.0 g. (0.204 mole, a 2 mole percent excess) of MDI dissolved in 40 g. of NMP and the isocyanate solution was slowly added over 5 hours. A further quantity of MDI, 1.0 g. (a further 2 mole percent excess) dissolved in 4 g. of NMP was added over a 2 hour period. The catalyst was neutralized by the addition of 0.2 g. of glacial acetic acid. There was thus obtained a polyamideimide having the recurring unit

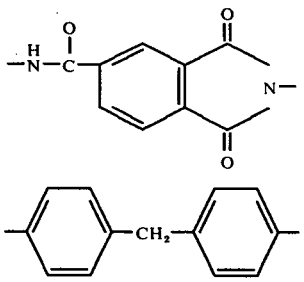

Films were cast from the NMP solution and had an average thickness of 3 mils.

EXAMPLE 8

A dry 500 ml. resin flask equipped according to Example 1 was charged with 49.8 g. (0.3 mole) of purified isophthalic acid and 0.32 g. (0.0026 mole) of potassium pyrrolidone. The flask contents were dissolved in 240 g. of dry NMP by stirring under nitrogen and the solution heated to 115° C. A solution consisting of 45.0 g. (0.18 mole) of MDI and 20.88 g. (0.12 mole) of a mixture of 80 percent 2,4-TDI and 20 percent 2,6-TDI dissolved in 28 g. of NMP was added to the flask at 115° C over a 6 hour period. An additional 0.84 g. (0.0048 mole) of the 2,4-and 2,6-TDI mixture along with 1.75 g. (0.0072 mole) of MDI were diluted with about 10 g. of NMP and added to the flask over a 2 hour period. The solution became very viscous and a solution of 0.2 g. of glacial acetic acid dissolved in 92 g. of NMP was added to reduce the solids content to about 20 percent. There was thus obtained a copolyamide having the recurring unit

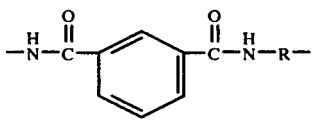

in which, in 60 percent of the recurring units, R represented

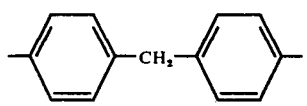

and, in the remaining 40 percent, R represented a mixture consisting of 80 percent

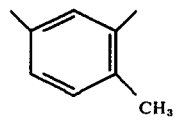

and 20 percent

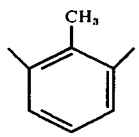

EXAMPLE 9

A dry 500 ml. resin flask equipped as in Example 1 was charged with 48.82 g. (0.2 mole) of purified brassylic acid, and 0.18 g. (0.0015 mole) of potassium pyrrolidone dissolved in 200 g. of dry NMP. The temperature was raised to 115° C and 50.0 g. (0.2 mole) of MDI dissolved in 44 g. of NMP was added dropwise over a 4 hour period. A 1 mole percent (0.5 g.) excess of MDI dissolved in 14 g. of NMP was added over 1 hour. Twelve drops of glacial acetic acid were added to the pale yellow solution to neutralize the catalyst. The polymer solution contained 24 percent by weight solids. The polymer was precipitated into water in a Waring Blendor, collected, washed with acetone, and finally dried by heating at 145° C in vacuum overnight. There was thus obtained a polyamide having the recurring unit

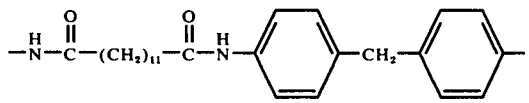

I claim:
1. In a process for preparing an essentially linear, dipolar aprotic solvent soluble solid polyimide by the condensation of an organic diisocyanate with a polycarboxylic compound containing two intramolecular carboxylic anhydride groups or free carboxylic acids thereof under anhydrous conditions in said solvent, the improvement which comprises adding to the solution of polyimide forming reactants a catalytic amount of a compound consisting essentially of

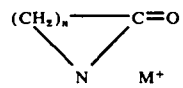

wherein n is an integer from 2 to 5 inclusive, and M is an alkali metal at a temperature of from about 40° C to about 140° C.
2. The process according to claim 1 wherein the catalyst is an alkali metal salt of pyrrolidone.
3. The process according to claim 1 wherein the polycarboxylic acid derivative comprises an aromatic tetracarboxylic acid dianhydride.
4. In a process for preparing an essentially linear, dipolar aprotic solvent soluble solid polyimide by the condensation of an organic diisocyanate with a polycarboxylic compound containing two intramolecular carboxylic anhydride groups or free carboxylic acids thereof in said solvent, the improvement which comprises adding to the solution of polyimide forming reactants a catalytic amount of a compound consisting essentially of an alkali metal salt of pyrrolidone at a temperature of from about 40° C to about 140° C.

5. The process according to claim 4 wherein the polycarboxylic acid derivative is 3,3',4,4'-benzophenonetetracarboxylic acid dianhydride.

6. The process according to claim 5 wherein the diisocyanate is a mixture comprising from about 10 to about 35 mole percent 4,4'-methylenebis(phenylisocyanate) and about 65 to about 90 mole percent of a member selected from the group consisting of 2,4-toluenediisocyanate, 2,6-toluenediisocyanate, and mixtures thereof.

7. The process according to claim 6 wherein the diisocyanate is a mixture comprising about 20 mole percent 4,4'-methylenebis(phenylisocyanate) and about 80 mole percent of a member selected from the group consisting of 2,4-toluenediisocyanate, 2,6-toluenediisocyanate, and mixtures thereof.

8. The process according to claim 7 wherein the dipolar aprotic solvent is N-methylpyrrolidone.

9. The process according to claim 7 wherein the dipolar aprotic solvent is dimethylformamide.

10. The process according to claim 7 wherein the catalyst is lithium pyrrolidone.

11. A process according to claim 1 wherein said polyimide remains dissolved in said dipolar aprotic solvent.

* * * * *

UNITED STATES PATENT OFFICE
CERTIFICATE OF CORRECTION

Patent No. 4,021,412　　　　　　　Dated May 3, 1977

Inventor(s) Besir K. Onder

It is certified that error appears in the above-identified patent and that said Letters Patent are hereby corrected as shown below:

Column 2, line 20:

M is n

Should read:

M is an

Column 7, lines 8-12:

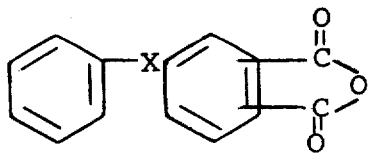

Should read:

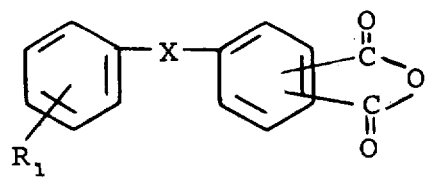

Column 7, line 26:

adjacent atoms

Should read:

adjacent carbon atoms

Column 8, line 27:

of which

Should read:

to which

Column 8, line 28:

resistance

Should read:

resistant

Column 8, line 44:

resistance

Should read:

resistant

Column 10, line 19:

(IR

Should read:

IR

UNITED STATES PATENT OFFICE
CERTIFICATE OF CORRECTION

Patent No. 4,021,412   Dated May 3, 1977

Inventor(s) Besir K. Onder

It is certified that error appears in the above-identified patent and that said Letters Patent are hereby corrected as shown below:

Column 10, line 64:   Should read:

(trimellite anhydride)   (trimellitic anhydride)

Column 11, line 12:   Should read:

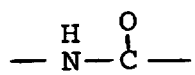   

Signed and Sealed this

Twenty-ninth Day of November 1977

[SEAL]

Attest:

RUTH C. MASON  
Attesting Officer

LUTRELLE F. PARKER  
Acting Commissioner of Patents and Trademark